United States Patent
Smeets

(10) Patent No.: US 7,089,274 B2
(45) Date of Patent: Aug. 8, 2006

(54) METHOD AND AN ELECTRICAL DEVICE FOR EFFICIENT GENERATION OF MULTI-RATE PSEUDO RANDOM NOISE (PN) SEQUENCE

(75) Inventor: Ben Smeets, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 665 days.

(21) Appl. No.: 09/742,711

(22) Filed: Dec. 20, 2000

(65) Prior Publication Data

US 2001/0005155 A1 Jun. 28, 2001

(30) Foreign Application Priority Data

Dec. 22, 1999 (EP) .................. 99610079

(51) Int. Cl.
*G06F 1/02* (2006.01)
(52) U.S. Cl. .................................. 708/250
(58) Field of Classification Search ......... 708/250–256
See application file for complete search history.

(56) References Cited

U.S. PATENT DOCUMENTS

| | | | | |
|---|---|---|---|---|
| 4,341,925 A * | 7/1982 | Frosch et al. ............... 708/250 |
| 4,845,654 A | 7/1989 | Harada et al. .............. 364/717 |
| 5,228,054 A | 7/1993 | Rueth et al. ................... 375/1 |
| 5,251,165 A * | 10/1993 | James, III .................... 708/250 |
| 5,864,491 A * | 1/1999 | Smeets ....................... 708/250 |
| 5,963,104 A * | 10/1999 | Buer .......................... 708/250 |
| 5,974,433 A * | 10/1999 | Currie ........................ 708/252 |
| 6,282,230 B1 * | 8/2001 | Brown et al. ............... 708/252 |
| 6,339,645 B1 * | 1/2002 | Smeets ....................... 708/250 |
| 6,430,170 B1 * | 8/2002 | Saints et al. ................ 708/250 |
| 6,636,553 B1 * | 10/2003 | Sriram ........................ 708/252 |

FOREIGN PATENT DOCUMENTS

| EP | 0246714 A | 11/1997 |
|---|---|---|
| WO | WO 99 45673 A | 9/1999 |

OTHER PUBLICATIONS

Smeets et al., Windmill pn-sequence generators, Sep. 1989, Computers and Digital Techniques, IEEE Proceedings, vol. 136, Issue 5, pp. 401-404.*

* cited by examiner

*Primary Examiner*—Kakali Chaki
*Assistant Examiner*—Chat C. Do

(57) ABSTRACT

An electrical device for generating a multi-rate pseudo random noise (PN) sequence. A sequence generator is adapted to output a plurality of sequence values based on a step control signal ($S_t$). A selection system is adapted to select one of a plurality of sequence values based on a select value ($M_t$). A step control is adapted to provide the step control signal ($S_t$). Also disclosed is a method of generating a multi-rate PN sequence.

16 Claims, 6 Drawing Sheets

METHOD AND AN ELECTRICAL DEVICE FOR EFFICIENT GENERATION OF MULTI-RATE PSEUDO RANDOM NOISE (PN) SEQUENCE

FIELD OF INVENTION

The present invention relates to an electrical device for generating a multi-rate PN sequence for use in cryptography, and coded communications when confidentiality is needed:

BACKGROUND OF THE INVENTION

Pseudo random noise sequences (PN sequences) are used in many cryptographic and communications applications to provide randomly appearing symbols. Typically, cryptographic applications are methods to provide confidentiality of transmitted information through the use of stream ciphers. In communications systems, PN sequences may be used for example as spreading sequences in spread-spectrum communications systems where they determine the hop sequence and/or the direct spreading sequence.

In general a receiver of a spread-spectrum communications system will receive a digital signal/bit stream transmitted over a single carrier frequency which is combined from a digital signal/bit stream containing information such as a digitized voice and from a PN sequence used to code or encrypt the transmission. Typically, the length of the PN sequence stream is much larger than the length of the information stream thereby, complicating identification of ciphers containing the actual information.

In prior art, the PN sequences are sometimes derived by using a maximal length polynomial. Constructions, whether hardware or software implemented, which form PN sequences, in this manner are sometimes referred to as m-sequence generators. It is well known that the randomness properties of the sequences generated by the m-sequence generators are very limited as a result of a linear relationship between the symbols of the sequence. This enables prediction of the next symbol given sufficiently many but small number of previous symbols. This is not desirable in various applications, and hence there is a need for efficient techniques to enhance the unpredictability.

Clock control of the m-sequence generator is a well-known method that can be used to increase the unpredictability of m-sequence generators. The most frequent method of clock control is that of introducing two modes of operation in an m-sequence generator. In one mode the generator outputs the previously produced symbol, and in the other mode the generator outputs the next symbol from the m-sequence. The current mode can advantageously be determined by another PN sequence. Output bits generated by a clock controlled m-sequence generator form the PN sequences which are used, inter alia, to encrypt or spread an information signal.

The abovementioned method of clock control, also sometimes referred to as the stop-and-go method, is especially used in hardware applications where it is easy to implement this stop-and-go method. However, the randomness properties of the resulting sequence, although less predictable, are impaired by the fact that the output sequence contains repetitions of previous symbols. This may obviated by using a step-once or step-twice ((1,2)-step) scheme, i.e. a basic m-sequence generator generates the next symbol (mode 1) or the symbol after the next symbol (mode 2), instead of the stop-and-go scheme. When implementing such a clock controlled generator, the basic m-sequence generator is required to produce symbols at twice the rate of the rate needed for output symbols. Known solutions for this depend on the use of a higher internal clock rate for the basic m-sequence generator or on the use of a very complex hardware applications of clock controlled basic m-sequence generators.

EP 0905611 A2 discloses a pseudorandom number generating method and pseudorandom number generator where a selector selects a pseudorandom number $X_j$ (a single bit) from either one of two function generator outputs on the basis of a previous pseudorandom number $X_{j-1}$. The two function generators generate data composed of a plurality of bits corresponding to state data held in a register. Another selector selects one of the data outputs of the function generators on the basis of the previous pseudorandom number $X_{j-1}$ and stores this in the register as state data.

The abovementioned pseudorandom generator in EP 0905611 A2 does not disclose a clock controlled multi-rate generator and is subject to the abovementioned deterioration of unpredictability, since a clock rate twice as high as the needed output rate is needed because only one symbol is output at a time.

U.S. Pat. No. 5,878,075 discloses a method of and an apparatus for generating a pseudorandom noise sequence (PN sequence), where a bit sequence of pseudorandom numbers is augmented by an extra bit in order to comply with the Interim Standard IS-95 for implementation of CDMA (Code Division Multiple Access), where a sequence of 215 bits is required.

Prior art methods and systems for generating PN sequences all require elaborate hardware and consequent expenditure of electrical power. There is therefore a need for a method and system for generating a PN sequence without the disadvantages of prior art.

SUMMARY OF THE INVENTION

An object of the invention is to provide an electrical device for efficient multi-rate PN sequence generation of simplified construction which is capable of generating one or more m-sequences at a multi-rate.

This object is achieved by an electrical device of the aforementioned type, said device further comprising:
  selection means adapted to select one of said plurality of sequence values on the basis of a select value ($M_t$), and
  step control means adapted to provide the step control signal ($S_t$).
The inventive device comprises:
  sequence generation means adapted to output a plurality of sequence values on the basis of a step control signal ($S_t$).

The present invention also relates to a method of generating a multi-rate PN sequence comprising the step of:
  generating a plurality of sequence values on the basis of a step control signal ($S_t$).

The invention provides a flexible, efficient and cryptographically more secure generation of sequences of pseudorandom ciphers which avoids the use of multiple system clocks and requires little additional hardware and thereby little additional power consumption.

In accordance with one embodiment of the device according to the invention, the select value ($M_t$) is provided on the basis of a clock control value/signal ($C_t$) and a previously generated select value ($M_{t-1}$).

In accordance with another embodiment, the step control signal ($S_t$) is provided on the basis of a clock control value/signal ($C_t$) and a previously generated select value ($M_{t-1}$).

In a preferred embodiment, the plurality of sequence values is two, the step control signal ($S_t$) is calculated as $S_t=(C_t+M_{t-1})$ DIV 2 and the select value ($M_t$) is calculated as $M_t=(C_t+M_{t-1})$ MOD 2.

Hereby a (1,2)-step clock controlled m-sequence generator is provided with very little additional hardware.

Alternatively, the plurality of sequence values is four and the select value ($M_t$) is calculated as $M_t=(C_t+M_{t-1})$ MOD 4 and the step control signal ($S_t$) is calculated as $S_t=(C_t+S_t)$ DIV 4.

An efficient (1, 2, 3, 4)-step clock controlled m-sequence generator is described hereinafter.

In general, any N-step clock controlled m-sequence generator may be provided according to this invention, where $N \geq 2$. Accordingly the select value ($M_t$) may be calculated as $M_t=(C_t+M_{t-1})$ MOD N and the step control signal ($S_t$) may be calculated as $S_t=(C_t+S_t)$ DIV N.

Hereby an efficient N-step clock controlled m-sequence generation method is provided which an unpredictability that grows with N.

In an embodiment, the sequence generation means is a windmill polynomial sequence generator.

In yet another embodiment the sequence generation means comprises:
 a plurality of delay elements,
 step control means receiving a next block control signal as input, and
 sum elements, where each delay element is connected to another and two of them are additionally connected to themselves via a sum element. A very simple and efficient implementation of a windmill polynomial sequence generator is provided hereinafter.

The invention also provides a method of efficient multi-rate PN sequence generation of simplified complexity which is capable of generating one or more m-sequences at a multi-rate, said method further comprising the steps of:
 providing a select value ($M_t$),
 providing the step control signal ($S_t$), and selecting one of said plurality of sequence values on the basis of the select value ($M_t$).

In this way a method is provided which efficiently provides a PN sequence with enhanced unpredictability but with minimal additional computational effort.

In accordance with one embodiment of the method according to the invention, the select value ($M_t$) is provided on the basis of a clock control value/signal ($C_t$) and a previously generated select value ($M_{t-1}$).

In accordance with another embodiment, the step control signal ($S_t$) is provided on the basis of a clock control value/signal ($C_t$) and a previously generated select value ($M_{t-1}$).

In a preferred embodiment, the plurality of sequence values is two, the step control signal ($S_t$) is calculated as $S_t=(C_t+M_{t-1})$ DIV 2 and the select value ($M_t$) is calculated as $M_t=(C_t+M_{t-1})$ MOD 2. A (1,2)-step clock controlled m-sequence generation method is thus provided with very little additional computational effort.

Alternatively, the plurality of sequence values is four and the select value ($M_t$) is calculated as $M_t=(C_t+M_{t-1})$ MOD 4 and the step control signal ($S_t$) is calculated as $S_t=(C_t+S_t)$ DIV 4. An efficient (1, 2, 3, 4)-step clock controlled m-sequence generation method is thus provided which is even more unpredictable.

In general any N-step clock controlled m-sequence generator may be provided according to this invention, where $N \geq 2$. Accordingly the select value ($M_t$) may be calculated as $M_t=(C_t+M_{t-1})$ MOD N and the step control signal ($S_t$) may be calculated as $S_t=(C_t+S_t)$ DIV N. An efficient N-step clock controlled m-sequence generation method is thus provided which an unpredictability that grows with N.

In one embodiment the plurality of sequence values is generated by a windmill polynomial sequence generator.

The present invention also relates to the use of the method and/or electrical device mentioned above in a portable device. In a preferred embodiment the portable device is a mobile telephone. Efficient and more safe encryption of digitized speech may thus be obtained.

Additionally, the reduced complexity of the hardware needed saves power which is especially important in e.g. a mobile telephone.

BRIEF DESCRIPTION OF THE DRAWING

The present invention will now be described more fully with reference to the drawings, in which.

DETAILED DESCRIPTION OF PREFERRED EMBODIMENTS

Figure 1:
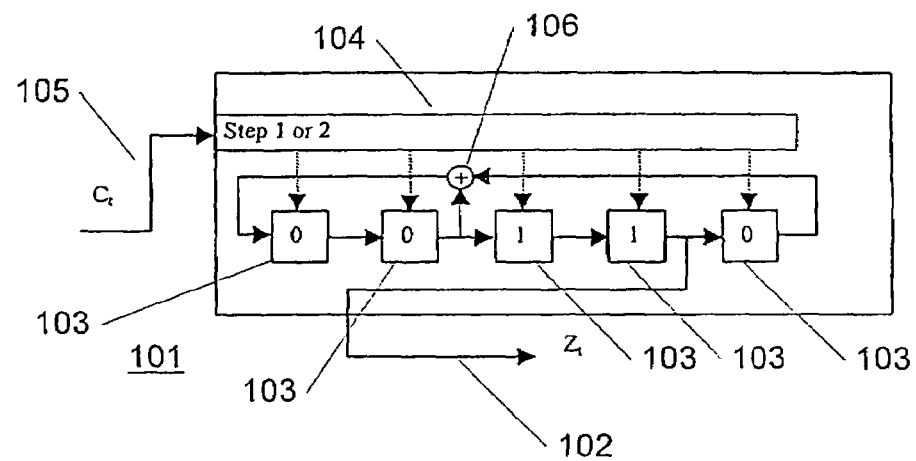
FIG. 1 illustrates a functional block diagram of a prior art (1,2)-step clock controlled m-sequence generator.

FIG. 1 illustrates a functional block diagram of a prior art (1,2)-step clock controlled m-sequence generator (101). This exemplary generator (101) outputs PN sequence symbols $Z_t$ (102). The generator (101) has L=5 delay elements (103) each connected to step control means (104) receiving a clock control signal $C_t$ (105) where t denotes the time instants 0, 1, 2, . . . . In this way each element (103) is clock controlled by a sequence C=C0, C1, C2, C3, . . . , where each symbol represents the value 1 or 2, i.e. $C_t \in \{1,2\}$.

As will be seen, every value in the delay element (103) is shifted to the right at each time instant, except the value of the (from left to right) first element (103) which updates to the sum (without a carry) of the values of the second and the fifth delay elements (103) by an adding element (106).

If the m-sequence generator (101) steps once every time instant, the generator (101) will produce the simple sequence $X=X_0, X_1, X_2, X_3, \ldots$. With the shown initial values of the delay elements (103) (from left to right 0, 0, 1, 1, 0) the output sequence will be X=1, 1, 0, 0, 0, 1, 1, 1. But if the stepping is controlled by the values of the symbols of C the following output sequence $Z=Z_0, Z_1, Z_2, Z_3, \ldots$, will be produced:

$$Z_t = X_{\sigma(t)} \quad t=0, 1, 2, 3, \ldots,$$

where $$\sigma(t) = \Sigma_i C_i \quad C_i \epsilon(1, 2),$$

and the sum $\Sigma$ goes from $i=0$ to $i=t-1$. In other words, the next symbol $Z_j$ is equal to either the next symbol $X_k$ (if $C_t=1$) or the next symbol again $X_{k+1}$ (if $C_t=2$). As an example, the sequence $Z_0=X_0$, $Z_1=X_2$, $Z_2=X_4$, $Z_3=X_6$, $Z_4=X_7$ will be output if $C_0=2$, $C_1=2$, $C_2=2$, $C_3=1$.

In this way the unpredictability of the PN sequence Zt (102) will be enhanced but creates the need for a clock rate for producing $X_t$ which is twice as fast as the rate desired for $Z_t$, since two symbols of X must be calculated for each symbol of Z. The faster clock rate needs more circuitry and/or multiple system clocks.

Figure 2:
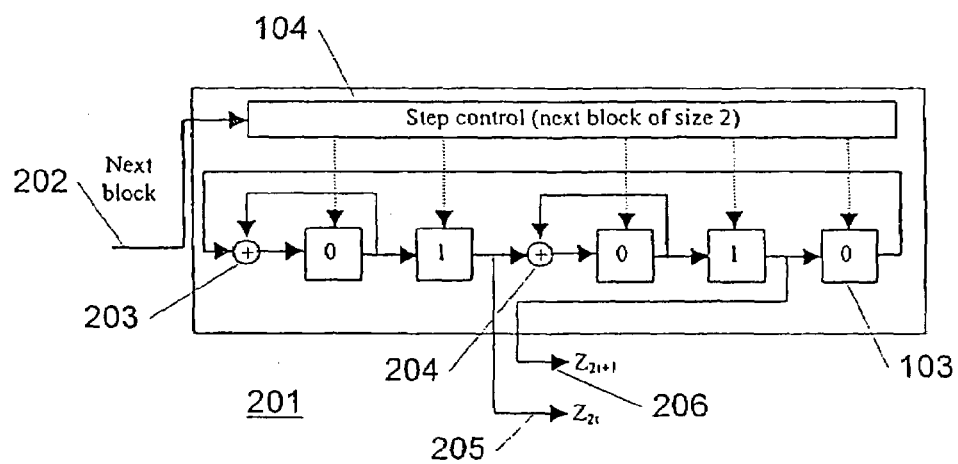
FIG. 2 illustrates a functional block diagram of a windmill generator.

FIG. 2 illustrates a functional block diagram of a windmill generator (201). This is a windmill application of the m-sequence generator shown in FIG. 1. Reference may be had to PCT publication WO 99/45673 to obtain information regarding a windmill polynomial and a windmill generator. Said PCT publication is incorporated hereiin by reference. Shown in FIG. 1 are L=5 delay elements (103) with step control means (104) connected to a next block control signal (202). The windmill generator (201) will output a sequence of the symbols $Z=Z_0, Z_1, Z_2, Z_3, \ldots$ in blocks of two tuples $(Z_{2t}, Z_{2t+t})$ (205, 206) for $t=0, 1, 2, \ldots$. For each time instant a two tuple is generated if the next block control signal (202) is enabled, i.e. true/1. If the next block control signal (202) is disabled, i.e. false/0, the generator repeats the previous block, i.e. does not step to the next block.

The values of the delay elements (103) are shifted from the left to the right at each time instant, except the value of the (from left to right) first element which updates to the sum (without a carry) of the values of itself and the fifth delay elements (103) by an adding element (203), and except the third element which updates to the sum (without a carry) of the values of itself and the previous/second element (103) by an adding element (204).

As an example, the initial values shown from left to right (0, 1, 0, 1, 0) will generate the following output sequence $Z_{2t}(205)=1, 0, 0, 1, 1, 0, 1$ and $Z_{2t+1}(206)=1, 0, 1, 1, 1, 0, 1$ for $t=0 \ldots 6$, if the next block control signal (202) is enabled.

In this way the need for extra circuitry and/or an extra system clock of higher rate is avoided, since a tuple of two values $(Z_{2t}, Z_{2t+1})$ of the PN sequence will be generated for each time instant, i.e. at each clock cycle.

Figure 3:
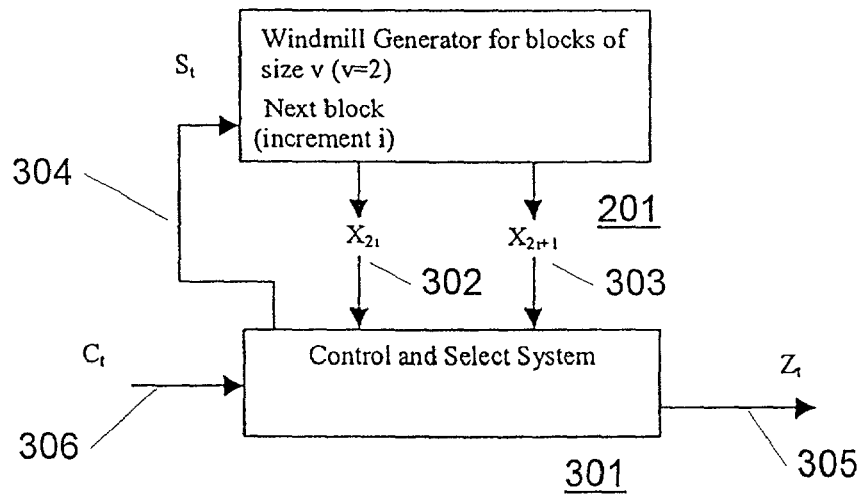
FIG. 3 schematically illustrates a combination of a windmill generator and a Clock and Select system (CS system)

FIG. 3 schematically illustrates a combination of a windmill generator (201) and a Clock and Select system (301). The Clock and Select system (301), denoted CS system in the following, will be described in greater detail for one application in connection with FIG. 4. The windmill generator (201) corresponds to the one shown in FIG. 2.

The windmill generator (201) generates blocks/tuples of size v. In this exemplary embodiment the blocks are of the size v=2, but blocks of other sizes are also within the scope of the present invention, as will be described later in connection with FIGS. 6 and 7.

This combination of the windmill generator (201) and the control and select (CS) system (301) will generate a multi-rate clock controlled m-sequence.

The output symbols from the windmill generator (201), now denoted $X_{2i}$ (302) and $X_{2i+1}$ (303), are sent to the CS system (301). The windmill generator (201) receives a step control signal $S_t$ (304) which corresponds to the next block signal (202) in FIG. 2.

The CS system (301) is responsible for the pacing of the windmill generator (201) by providing the step control signal $S_t$ (304) and for selecting one of the two output symbols $X_{2i}$ (302) and $X_{2i+1}$ (303). The selected symbol is the final output symbol $Z_t$ (305).

The CS system (301) receives a clock control signal $C_t$ (306) which paces the CS system (301), since one set of symbol $X_{2i}$ (302) and $X_{2i+1}$ (303) and thereby one output symbol $Z_t$ (305) will be generated for each value of the clock control signal $C_t$ (306). One detailed embodiment of the CS system (301) will be explained in connection with FIG. 4.

In this way, one cipher of the PN sequence will be generated for each clock cycle. The resulting PN sequence has a high degree of unpredictability since no linear relationship between the output ciphers exists, i.e. either the next symbol or the next symbol again is output. The output is obtained at the same rate as the input clock rate ($C_t$) without the need for multiple clocks and by very little additional hardware.

Figure 4:
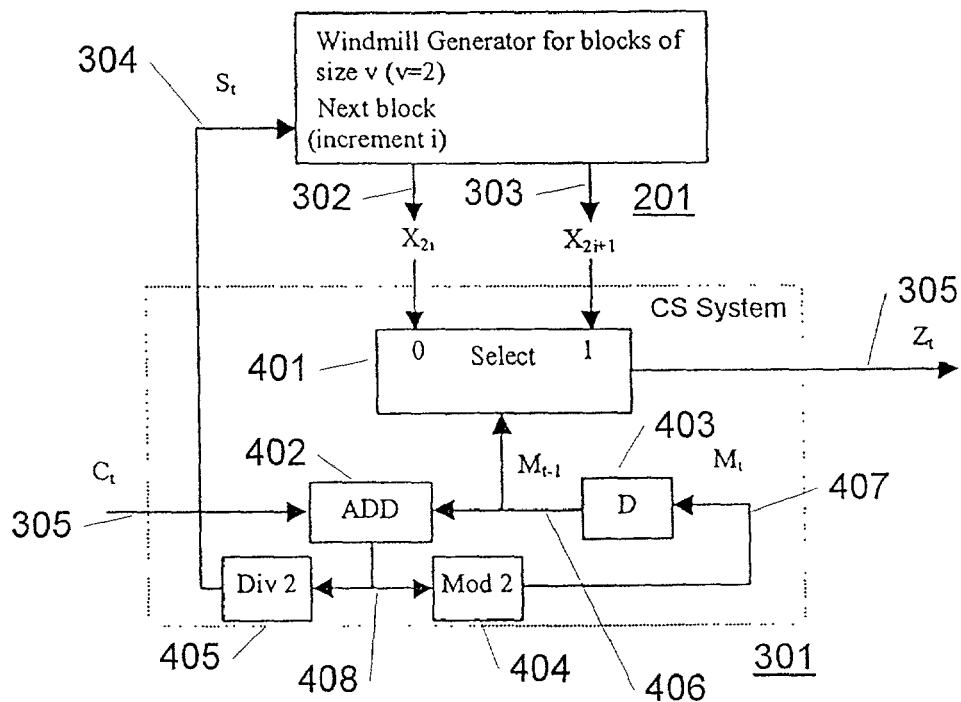
FIG. 4 shows one realisation of the CS system shown in FIG. 3.

FIG. 4 shows one application of the CS system (301) shown in FIG. 3. This application of the CS system (301) in combination with the windmill generator (201) will result in a (1,2)-step clock controlled m-sequence generator.

Shown is selection means (401) adapted to select one of the two symbols $X_{2i}$ (302) and $X_{2i+1}$ provided by the windmill generator (201). The selection is done on the basis of a previously generated select value $M_{t-1}$ (406) (generated in the prior time instant as described later). If the previously generated select value $M_{t-1}$ (406) is false/0 then one symbol from the windmill generator is selected, and if the value $M_{t-1}$ (406) is true/1 the other symbol is selected. In the shown example, the symbol $X_{2i}$ (302) is chosen for $M_{t-1}$ (406) being false and $X_{2i+1}$ is chosen for $M_{t-1}$ (406) being true, but it could also be vice versa. The selected symbol is the final output symbol $Z_t$ (305).

The previously generated select value $M_{t-1}$ (406) is received from a delay element D (403) which keeps a newly generated select value $M_t$ (407) for one time instant/clock cycle.

The clock control signal value $C_t$ (306), pacing the CS system, is added by addition means (402) to the previously generated select value $M_{t-1}$ (406). The sum (408) of $C_t$ (306) and the previously generated select value $M_{t-1}$ (406) can take the values 1, 2, 3.

From this sum (408) the new select value $M_t$ (407) is derived by the MOD 2 means (404), i.e. $M_t$ (407)=($C_t$ (306)+$M_{t-1}$ (406)) MOD 2, and the new select value $M_t$ (407) is kept in the delay element D (403), as described above.

The sum (408) is also used to derive the step control signal $S_t$ (304) which is derived by the DIV 2 means (405), i.e. $S_t$ (304)=($C_t$ (306)+$M_{t-1}$ (406)) DIV 2. The step control signal $S_t$ (304) is used by the windmill generator (201) to derive the two symbols $X_{2i}$ (302) and $X_{2i+1}$, as described above.

In this way, the device shown in FIG. 3 is implemented by use of minimal hardware.

Figure 5:
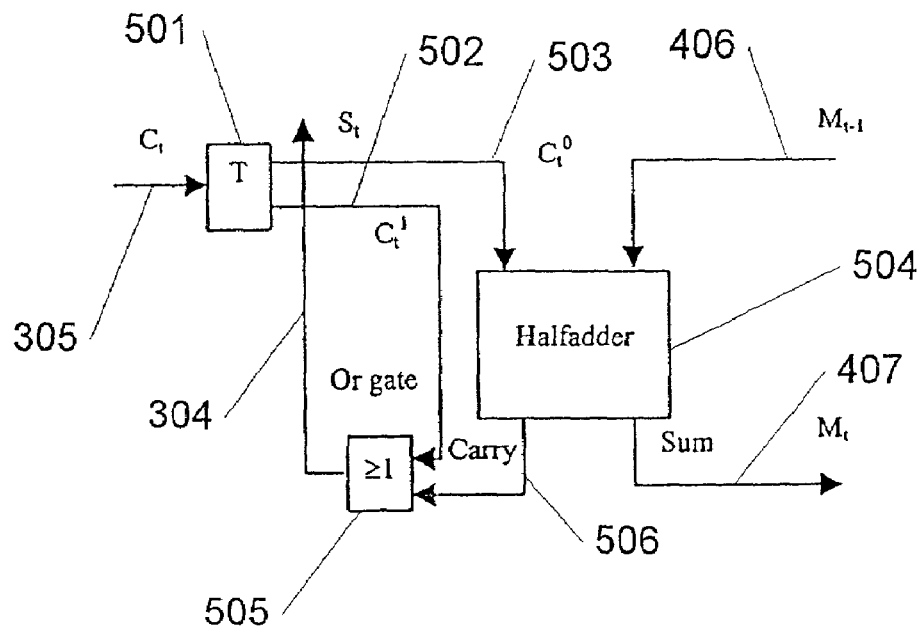
FIG. 5 shows a preferred realisation of ADD, MOD 2, and DIV 2 operations in hardware.

FIG. 5 shows a preferred application of ADD, MOD 2, and DIV 2 operations in hardware. The combination of ADD, MOD 2, and DIV 2 functionality may advantageously be realised in hardware by a 1 bit half-adder circuit (504).

The clock control signal $C_t$ (305) is split into two signals, $C_{t0}$ (503) and $C_{t1}$ (502), by a logic circuit (501), preferably according to the following table:

| $C_t$ | $IC_t^0$ | $C_t^1$ |
|---|---|---|
| 0 | 1 | 0 |
| 1 | 0 | 1 |

In this way $C_t^1$ (502) is always equal to $C_t$ (305) and $C_t^0$ (503) is always inverted to $C_t$ (305).

$C_t^0$ (503) is added to the previously generated select value $M_t-1$ (406) by the 1 bit half-adder circuit (504). The result consists of two signals (506, 407) which represents the carry and the sum of the addition, respectively. The sum corresponds to a MOD 2 function since it is performed without a carry. The sum is the select value $M_t$ (407).

The carry signal (506) corresponds to a DIV 2 function and is used as input together with $C_t1$(502) (equal to $C_t$ (305)) in an OR gate (505). The result of the OR gate (505) is the step control signal $S_t$ (304) used to control the windmill generator (201).

This application greatly reduces the complexity of the hardware needed to provide a (1,2)-step clock controlled m-sequence generator.

Figure 6:
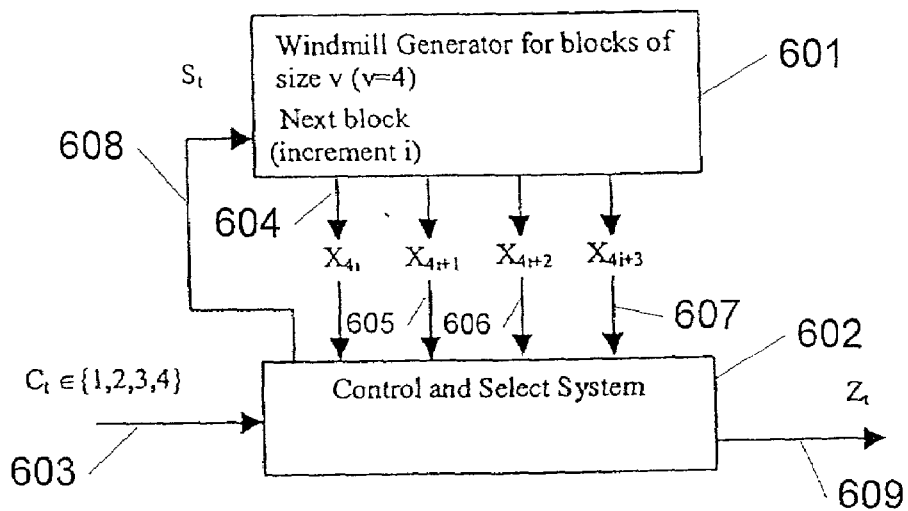
FIG. 6 shows a generalisation of the bi-rate method described to a quaternary-rate (1, 2, 3, 4)-step clock controlled m-sequence generator.

FIG. 6 shows a generalisation of the bi-rate method described to a quaternary-rate (1, 2, 3, 4)-step clock controlled m-sequence generator. Shown are a windmill generator (601) and a CS system (602) which has been generalised from a bi-rate to a quaternary-rate.

The CS system (602) receives the clock control signal value $C_t$ (603) now $\epsilon\{1, 2, 3, 4\}$ and the windmill generator outputs four sequence values/symbols $X_{4i}$ (604), $X_{4i+1}$ (605), $X_{4i+2}$ (606), $X_{4i+3}$ (607) on the basis of the step control signal $S_t$ (608).

Only one of the four sequence values (604–607) is selected as the final output symbol $Z_t$ (609) of the PN sequence. The selection of one of the four symbols (604–607) in the CS system (602) is still provided on the basis of a previously generated select value $M_{t-1}$.

The step control signal $S_t$ (608) is still provided on the basis of the clock control signal value $C_t$ (603) and the previously generated select value $M_{t-1}$, according to:

$$S_t=(C_t(603)+M_{t-1}) \text{ DIV } 4,$$

and the new generated select value $M_t$ is provided on the basis of the clock control signal value $C_t$ (603) and the previously generated select value $M_{t-1}$ according to:

$$M_t=(C_t(603)+M_{t-1}) \text{ MOD } 4.$$

In this way a PN sequence with an even larger degree of unpredictability is provided with very little additional hardware.

Even PN sequences with a larger rate then four may be implemented, as described in connection with FIG. 7, using the same techniques and giving the same advantages as described above.

Figure 7:
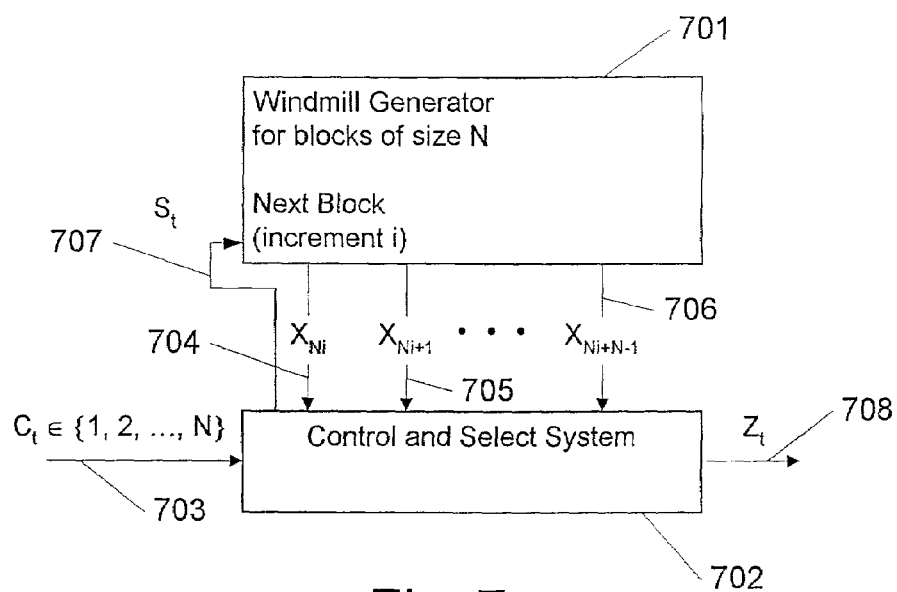
FIG. 7 shows a generalized embodiment of a clock controlled m-sequence generator.

FIG. 7 shows a generalized embodiment of a clock controlled m-sequence generator. Shown are a windmill generator (701) and a CS system (702) which has been generalised to a N-rate, where N is at least 2.

The CS system (702) receives the clock control signal value $C_t$ (703) now $\epsilon\{1, \ldots, N\}$ and the windmill generator outputs N sequence values/symbols $X_{Ni}$ (704), $X_{Ni+1}$ (705), $\ldots$, $X_{Ni+N-1}$ (706) on the basis of the step control signal $S_t$ (707).

Only one of the N sequence values (704–706) is selected as the final output symbol $Z_t$ (709) of the PN sequence. The selection of one of the N symbols (704–706) in the CS system (602) is still provided on the basis of a previously generated select value $M_{t-1}$.

The step control signal $S_t$ (707) may be provided on the basis of the clock control signal value $C_t$ (703) and the previously generated select value $M_{t-1}$ according to:

$$S_t=(C_t(703)+M_{t-1}) \text{ DIV } N,$$

and the new generated select value Mt may be provided on the basis of the clock control signal value $C_t$ (703) and the previously generated select value $M_{t-1}$ according to:

$$M_t=(C_t(703)+M_{t-1}) \text{ MOD } N.$$

In this way, a PN sequence with an arbitrary large degree of unpredictability is provided with very little additional hardware.

The degree of unpredictability may be chosen according to a specific need for a given implementation.

Figure 8:
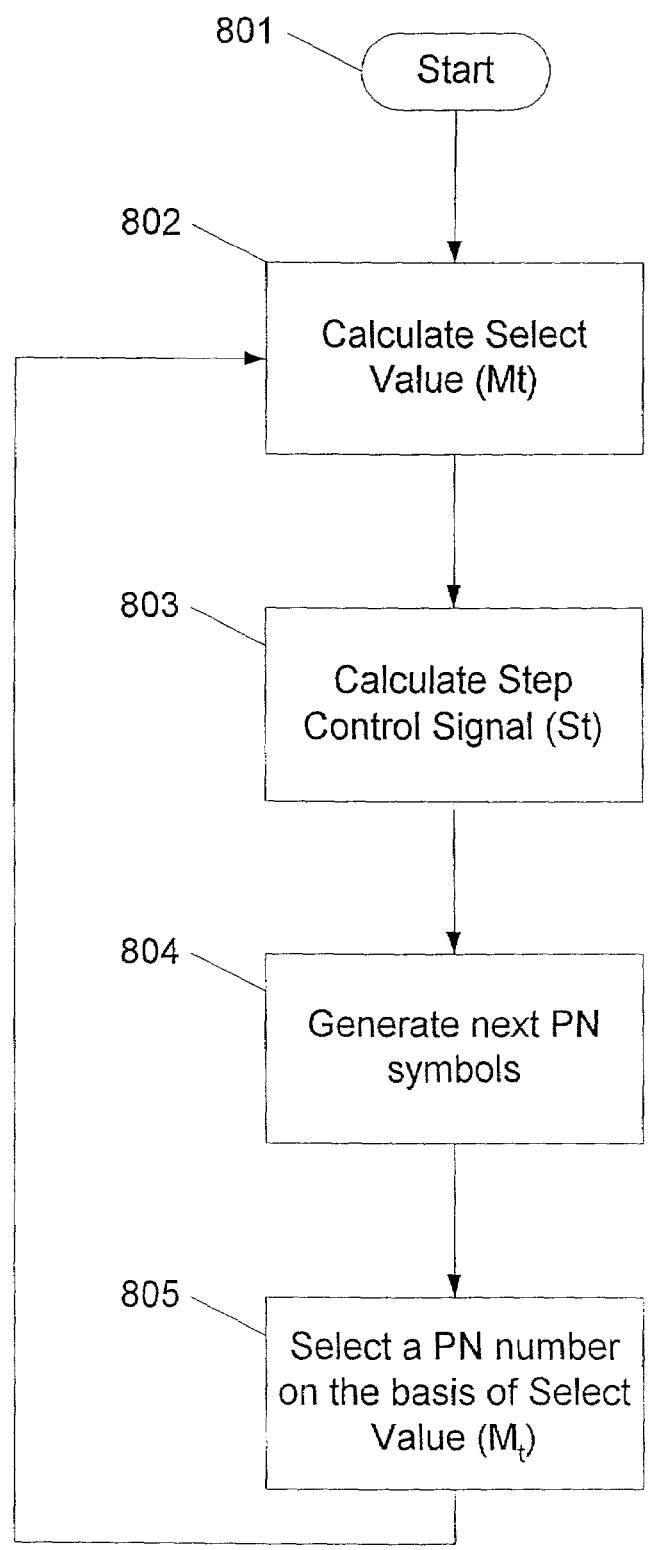
FIG. 8 shows a flow chart of the method according to the invention.

FIG. 8 shows a flow chart of the method according to the invention. The method generates a plurality of PN sequence values/symbols and selects one of these as output.

The method is initialised at step (801).

At step (802) a select value $M_t$ is provided. The select value $M_t$ may be calculated on the basis of a clock control value/signal $C_t$ and a previously generated select value $M_{t-1}$. The clock signal $C_t$ may e.g. be provided by an external control method or hardware circuit. The first time a select value is calculated, the previously generated select value may have the initial value of 0 or 1.

Preferably, the select value $M_t$ is calculated as $M_t=(C_t+M_{t-1})$ MOD 2 for a plurality of sequence values being equal to two.

Alternatively, the select value Mt may be calculated as $M_t=(C_t+M_{t-1})$ MOD 4 for a plurality of sequence values being equal to four.

Other functions than MOD and DIV and other values than $C_t$ and $M_{t-1}$ may be provided.

At step (803) a control signal St is provided. The generated control value $S_t$ is used to control the generation of sequence values at step (804).

The control signal $S_t$ may be calculated on the basis of the clock control signal $C_t$ and the previously generated select value $M_{t-1}$.

Preferably, the control value $S_t$ is calculated as $S_t=(C_t+M_{t-1})$ DIV 2 for a plurality of sequence values being equal to two.

Alternatively, the control value St may be calculated as $S_t=(C_t+M_{t-1})$ DIV 4 for a plurality of sequence values being equal to four, but other functions and arguments may be provided.

The control value $S_t$ and the select value $M_t$ are calculated in this way on the basis of the same signals.

At step (804) a plurality of symbols/sequence values is generated. The generation of values may be done by any kind of sequence generator, e.g. a m-sequence generator, etc., but preferably the sequence generator is a windmill polynomial sequence generator. Alternatively, the generation may be done completely in software by methods corresponding to the mentioned generators.

The number of generated sequence values may vary according to how safe the method is to be, with a concomitant increase in the computational effort. Preferably, the number of generated values may be two or four, but any other number is just as applicable.

For two generated values, the next symbol and the next symbol again of the standard m-sequence generator are generated at the same time. For four values, the four next symbols will be generated, etc.

Preferably, the generation sequence values are controlled on the basis of the control signal St generated at step (802).

At step (805) one of the plurality of generated sequence values is selected and output as the next symbol in the output PN sequence. Preferably, the selection is done on the basis of the select value $M_t$. This selection of a value between a plurality of uncorrelated sequence values greatly enhances the unpredictability of the output sequence.

After execution of step (805) the method loops back to step (802). One loop is executed for each time step/instance.

In this way, a higher degree of unpredictability is obtained by very little computational effort.

Figure 9:
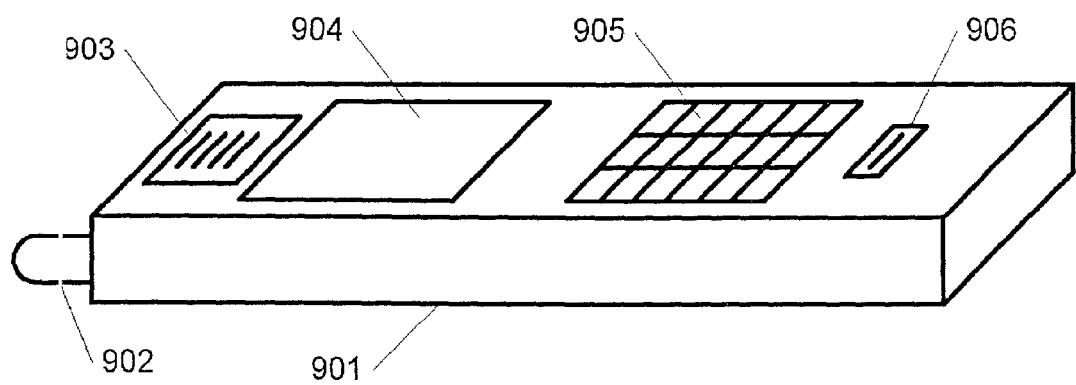
FIG. 9 shows the preferred embodiment of the invention, which may contain the electrical device and/or use the method according to the present invention.

FIG. 9 shows a preferred embodiment of the invention, which may contain the electrical device and/or use the method according to the present invention. Shown is a mobile telephone (901) having display means (904), a keypad (905), an antenna (902), a microphone (906), and a speaker (903). By including the electrical device and/or the method according to the present invention a more safe and efficient encryption of speech signal is provided, just requiring very little additional hardware and/or additional computational effort.

Figure 10A:
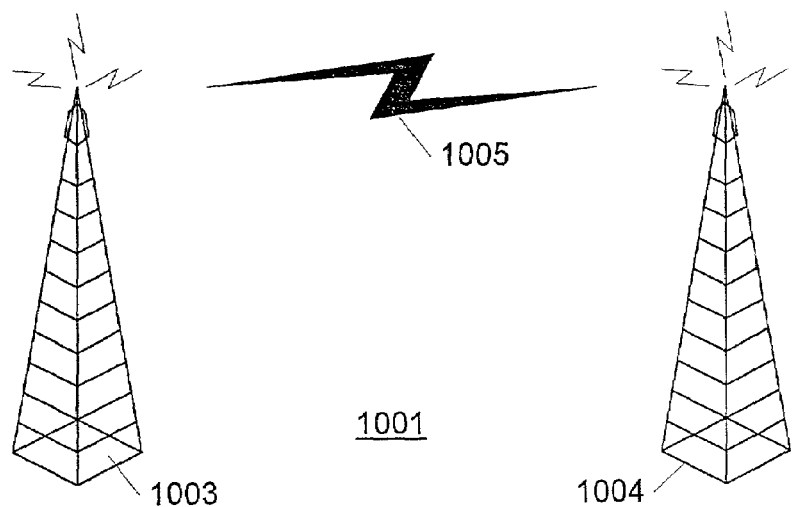
FIGS. 10*a* and 10*b* show two exemplary implementations of a system using the method and/or device according to the invention.
Figure 10B:
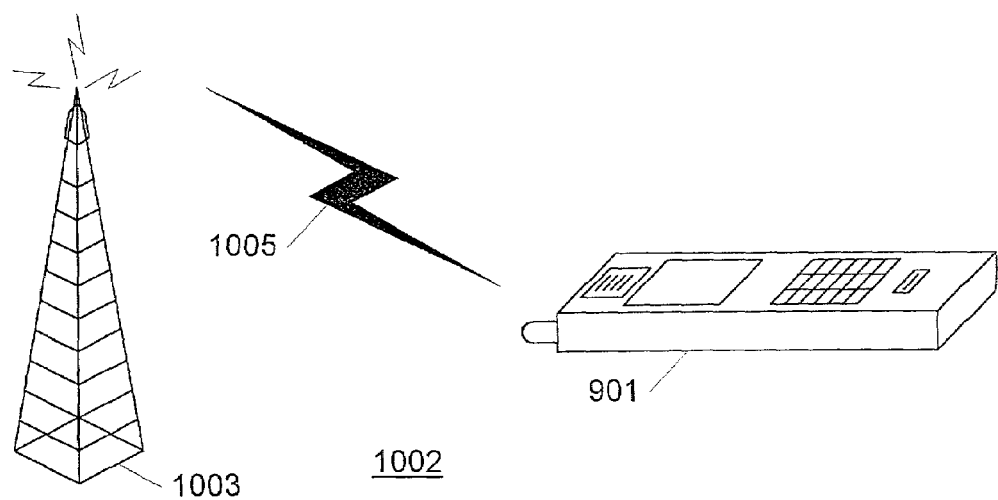

FIGS. 10*a* and 10*b* show two exemplary implementations of a system using the method and/or device according to the invention.

FIG. 10*a* shows a communications system (1001) comprising a first transmitting/receiving station (1003) and a second sending/receiving station (1004) where information (1005) may be transmitted. The PN sequences generated by a (1,2)-step clock control m-sequence generator of an embodiment of the present invention may be used as a sub-component to encrypt information (1005) to be transmitted between the first transmitting/receiving station (1003) and the second transmitting/receiving station (1004).

Alternatively, a quaternary-rate (1, 2, 3, 4)-step clock controlled m-sequence generator or other rate generators, as described in connection with FIGS. 6 and 7, may be provided in the system to improve the unpredictability even further.

In this way, safe transmission of information (1005) like data, digitized speech signals, etc. may be achieved by using less hardware, thereby reducing the costs and power consumption.

FIG. 10*b* shows a transmitting/receiving station (1003) and a mobile terminal (901) which form a cellular communications system (1002). The information (1005) to be transmitted/received between the mobile terminal (901) and a network infrastructure (not shown) via the transmitting/receiving station (1003) may be encrypted through the use of a ciphering system that uses PN sequences generated by multi-rate clock controlled m-sequence generators.

Alternatively, a quaternary-rate (1, 2, 3, 4)-step clock controlled m-sequence generator or other rate generators, as described in connection with FIGS. 6 and 7. may be provided in the system to improve the unpredictability even further.

In this way, safe transmission of information (1005) like data, digitized speech signals, etc. may be achieved by using less hardware, thereby reducing the costs and power consumption.

Equivalents

Although preferred embodiments of the method and apparatus of the present invention have been illustrated in the accompanying drawings as described in the foregoing detailed description, it will be understood that the invention is not limited to the embodiments disclosed, but is capable of numerous rearrangements, modifications, equivalents and substitutions without departing from the scope of the invention as set forth in the appended claims.

The invention claimed is:

1. An electrical device for generating a pseudo random noise (PN) output sequence ($Z_t$) comprising:
   a sequence generator to output a plurality of sequence values ($X_{2i}$, $X_{2i+1}$) based on a step control signal ($S_t$); wherein the plurality of sequence values is two;
   a control and selection system coupled to the sequence generator adapted to select one of the plurality of sequence values ($X_{2i}$, $X_{2i+1}$) from the sequence generator based on a select value ($M_t$), wherein the select value ($M_t$) is provided based on a clock control value or signal ($C_t$) and a previously generated select value ($M_{t-1}$); wherein the select value ($M_t$) is calculated as $M_t = (C_t + M_{t-1})$ MOD 2; and
   a step control of the control and selection system adapted to provide the step control signal ($S_t$) to the sequence generator, wherein the step control signal ($S_t$) is provided based on the clock control value or signal ($C_t$) and the previously generated select value ($M_{t-1}$) wherein the step control signal ($S_t$) is calculated as $S_t = (C_t + M_{t-1})$ DIV 2.

2. An electrical device for generating a pseudo random noise (PN) output sequence ($Z_t$) comprising:
   a sequence generator adapted to output a plurality of sequence values ($X_{Ni} \ldots X_{Ni+N-1}$) based on a step control signal (St) wherein the plurality of sequence values is N, where N is at least 3;
   a control and selection system coupled to the sequence generator adapted to select one of the plurality of sequence values ($X_{Ni} \ldots X_{Ni+N-1}$) from the sequence generator based on a select value ($M_t$), wherein the select value ($M_t$) is provided based on a clock control value or signal ($C_t$) and a previously generated select value ($M_{t-1}$); the select value ($M_t$) is calculated as $M_t = (C_t + M_{t-1})$ MOD N; and
   a step control of the control and selection system adapted to provide the step control signal ($S_t$) to the sequence generator, wherein the step control signal ($S_t$) is provided based on the clock control value or signal ($C_t$) and the previously generated select value ($M_{t-1}$) the step control signal ($S_t$) is calculated as $S_t = (C_t + M_{t-1})$ DIV N.

3. The electrical device according to claim 2, wherein said sequence generator comprises a windmill polynomial sequence generator.

4. An electrical device for generating a pseudo random noise (PN) output sequence ($Z_t$) comprising:
   a sequence generator to output a plurality of sequence values ($X_{Ni} \ldots X_{Ni+N-1}$) based on a step control signal (St) wherein the sequence generator comprises a windmill polynomial sequence generator;
   the sequence generator having a plurality of delay elements;
   a step control unit receiving a next block control signal as input; and
   sum elements; where each said delay element is connected to another and two of them are additionally connected to themselves via a sum element;
   a control and selection system coupled to the sequence generator adapted to select one of the plurality of sequence values ($X_{Ni} \ldots X_{Ni+N-1}$) based on a select value ($M_t$), wherein the select value ($M_t$) is provided based on a clock control value or signal ($C_t$) and a previously generated select value ($M_{t-1}$); and a step control of the control and selection system adapted to provide the step control signal ($S_t$) to the sequence generator, wherein the step control signal ($S_t$) is provided based on the clock control value or signal ($C_t$) and the previously generated select value ($M_{t-1}$).

5. The electrical device according to claim 4, wherein said electrical device is used in a portable device.

6. The device according to claim 5, wherein said portable device is a mobile telephone.

7. The device according to claim 4, wherein said electrical device is used in a stationary communication device.

8. A method of generating a PN output sequence ($Z_t$) comprising the steps of:

generating a plurality of sequence values ($X_{2i}$, $X_{2i+1}$) based on a step control signal ($S_t$), wherein the plurality of sequence values ($X_{2i}$, $X_{2i+1}$) is two, the method further comprising the steps of:

providing a select value ($M_t$), wherein the select value ($M_t$) is based on a clock control value or signal ($C_t$) and a previously generated select value ($M_{t-1}$); wherein the select value ($M_t$) is calculated as $M_t = (C_t + M_{t-1})$ MOD 2; and providing the step control signal ($S_t$), wherein the step control signal ($S_t$) is based on the clock control value or signal ($C_t$) and the previously generated select value ($M_{t-1}$) and the step control signal ($S_t$) is calculated as $S_t = (C_t + M_{t-1})$ div 2; and selecting one of the plurality of sequence values ($X_{2i}$, $X_{2i+1}$) on the basis of the select value ($M_t$); and outputting one of said plurality of sequence values ($X_{2i}$, $X_{2i+1}$) as one element of a PN output sequence ($Z_t$).

9. A method of generating a PN output sequence ($Z_t$) comprising the steps of:

generating a plurality of sequence values ($X_{Ni}$ ... $X_{Ni+N-1}$) based on a step control signal ($S_t$) wherein the plurality of sequence values is N, where N is at least 3, the method further comprising the steps of:

providing a select value ($M_t$), wherein the select value ($M_t$) is based on a clock control value or signal ($C_t$) and a previously generated select value ($M_{t-1}$) and wherein the select value ($M_t$) is calculated as $M_t = (C_t + M_{t-1})$ MOD N; and;

providing the step control signal ($S_t$), wherein the step control signal ($S_t$) is based on the clock control value or signal ($C_t$) and the previously generated select value ($M_{t-1}$) and wherein the step control signal ($S_t$) is calculated as $S_t = (C_t + M_{t-1})$ DIV N; and selecting one of the plurality of sequence values ($X_{Ni}$ ... $X_{Ni+N-1}$) on the basis of the select value ($M_t$); and outputting one of said plurality of sequence values ($X_{Ni}$ ... $X_{Ni+N-1}$) as one element of a PN output sequence ($Z_t$).

10. The method according to claim 9, wherein said plurality of sequence values ($X_{Ni}$ ... $X_{Ni+N-1}$) is generated by a windmill polynomial sequence generator.

11. The method according to claim 9, wherein said method is used in a portable device.

12. The method according to claim 11, wherein said method is used in a mobile telephone.

13. The method according to claim 9, wherein said method is used in a stationary communication device.

14. A pseudo random noise (PN) generator, comprising:
a sequence generator module;
a control and select system module coupled to the sequence generator module;
the sequence generator module adapted to provide a plurality of sequence values ($X_{Ni}$ ... $X_{Ni+N-1}$) to the control and select system module based on a step control signal ($S_t$) fed into the sequence generator module from the control and select system module, wherein the plurality of sequence values ($X_{Ni}$ ... $X_{Ni+N-1}$) is two;

the control and select system module adapted to select one of the plurality of sequence values ($X_{Ni}$ ... $X_{Ni+N-1}$) based on a select value ($M_t$) generated by the control and select system module wherein the select value ($M_t$) is generated based on a clock control value or signal ($C_t$) and a previously generated select value ($M_{t-1}$);

the control and select system module being adapted to generate the step control signal ($S_t$) based on the clock control value or signal ($C_t$) and the previously generated select value ($M_{t-1}$), wherein, the step control signal ($S_t$) is calculated as $S_t = (C_t + M_{t-1})$ DIV 2; and the control and select system module adapted to output the selected one of the plurality of sequence values ($X_{Ni}$ ... $X_{Ni+N-1}$) as one element of a PN output sequence ($Z_t$).

15. A pseudo random noise (PN) generator, comprising:
a sequence generator module;
a control and select system module coupled to the sequence generator module;
the sequence generator module adapted to provide a plurality of sequence values ($X_{Ni}$ ... $X_{Ni+N-1}$) to the control and select system module based on a step control signal ($S_t$) fed into the sequence generator module from the control and select system module; wherein the plurality of sequence values ($X_{Ni}$ ... $X_{Ni+N-1}$) is N, where N is at least 3;

the control and select system module adapted to select one of the plurality of sequence values ($X_{Ni}$ ... $X_{Ni+N-1}$) based on a select value ($M_t$) generated by the control and select system module wherein the select value ($M_t$) is generated based on a clock control value or signal ($C_t$) and a previously generated select value ($M_{t-1}$), wherein the select value ($M_t$) is calculated as $M_t = (C_t + M_{t-1})$ MOD N;

the control and select system module being adapted to generate the step control signal ($S_t$) based on the clock control value or signal ($C_t$) and the previously generated select value ($M_{t-1}$); wherein the step control signal ($S_t$) is calculated as $S_t = (C_t + M_{t-1})$ DIV N; and the control and select system module adapted to output the selected one of the plurality of sequence values ($X_{Ni}$ ... $X_{Ni+N-1}$) as one element of a PN output sequence ($Z_t$).

16. The pseudo random noise (PN) generator of claim 5, wherein the sequence generator module comprises a windmill polynomial sequence generator.

* * * * *

UNITED STATES PATENT AND TRADEMARK OFFICE
CERTIFICATE OF CORRECTION

PATENT NO.         : 7,089,274 B2
APPLICATION NO. : 09/742711
DATED                 : August 8, 2006
INVENTOR(S)       : Ben Smeets It is certified that error appears in the above-identified patent and that said Letters Patent is hereby corrected as shown below:

At col. 3, lines 9-10, please replace "St = (Ct+St) DIV 4" with --St = (Ct + Mt-1) DIV 4--.

At col. 3, line 17, please replace "St = (Ct+St) DIV N" with --St = (Ct + Mt-1) DIV N--.

At col. 3, line 62-63, please replace "St = (Ct+St) DIV 4" with --St = (Ct + Mt-1) DIV 4--.

At col. 4, line 3, please replace "St = (Ct+St) DIV N" with --St = (Ct + Mt-1) DIV N--.

In the table at the top of col. 7, replace "ICt0" with --Ct0--.

In claim 8, col. 11 line 29, replace "div 2" with --DIV 2--.

In claim 16, col. 12, line 58, replace "claim 5" with --claim 15--.

Signed and Sealed this

Twenty-sixth Day of December, 2006

JON W. DUDAS
*Director of the United States Patent and Trademark Office*

UNITED STATES PATENT AND TRADEMARK OFFICE
CERTIFICATE OF CORRECTION

PATENT NO. : 7,089,274 B2
APPLICATION NO. : 09/742711
DATED : August 8, 2006
INVENTOR(S) : Ben Smeets It is certified that error appears in the above-identified patent and that said Letters Patent is hereby corrected as shown below:

At col. 3, lines 9-10, please replace "St = ($C_t$+$S_t$) DIV 4" with --$S_t$ = ($C_t$ + $M_{t-1}$) DIV 4--.

At col. 3, line 17, please replace "St = ($C_t$+$S_t$) DIV N" with --$S_t$ = ($C_t$ + $M_{t-1}$) DIV N--.

At col. 3, line 62-63, please replace "$S_t$ = ($C_t$+$S_t$) DIV 4" with --$S_t$ = ($C_t$ + $M_{t-1}$) DIV 4--.

At col. 4, line 3, please replace "St = ($C_t$+$S_t$) DIV N" with --$S_t$ = ($C_t$ + $M_{t-1}$) DIV N--.

In the table at the top of col. 7, replace "$IC_t^0$" with --$C_t^0$--.

In claim 8, col. 11 line 29, replace "div 2" with --DIV 2--.

In claim 16, col. 12, line 58, replace "claim 5" with --claim 15--.

This certificate supersedes Certificate of Correction issued December 26, 2006.

Signed and Sealed this

Seventeenth Day of April, 2007

JON W. DUDAS
*Director of the United States Patent and Trademark Office*